No. 780,297. PATENTED JAN. 17, 1905.
S. R. & S. V. KROM.
PROCESS OF SEPARATING GRAPHITE FROM WOLLASTONITE.
APPLICATION FILED NOV. 16, 1903.
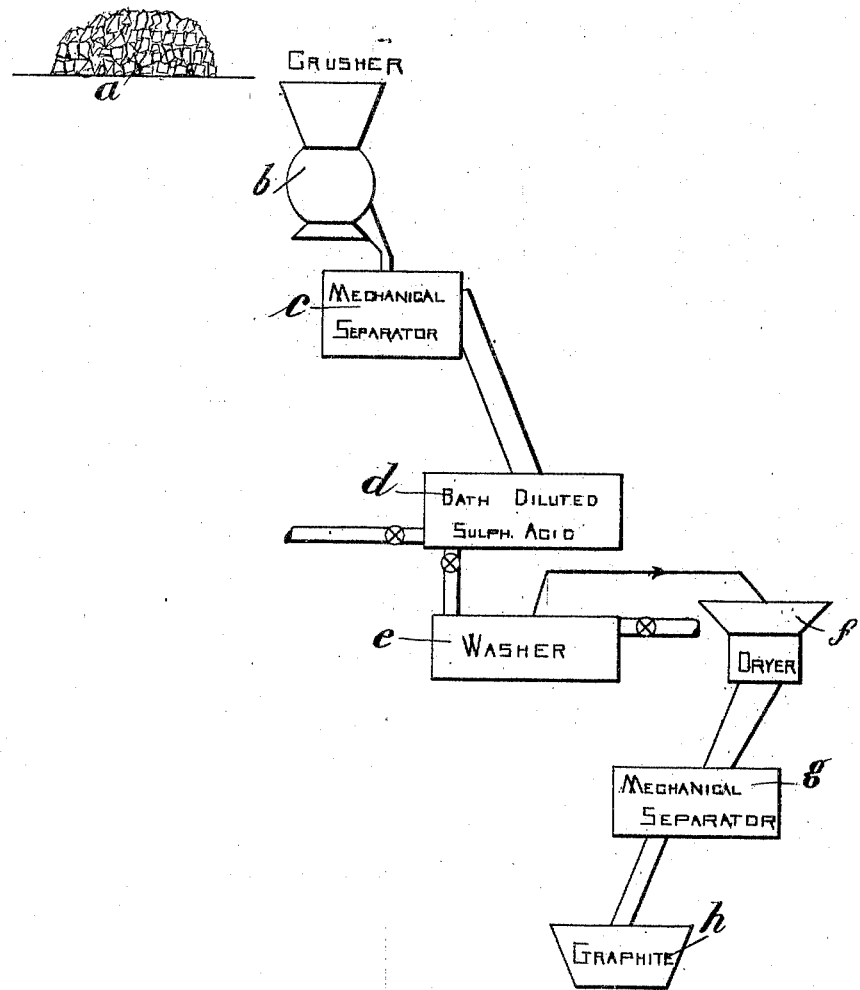

No. 780,297. Patented January 17, 1905.

UNITED STATES PATENT OFFICE.

STEPHEN R. KROM, OF PLAINFIELD, AND STANLEY V. KROM, OF JERSEY CITY, NEW JERSEY.

PROCESS OF SEPARATING GRAPHITE FROM WOLLASTONITE.

SPECIFICATION forming part of Letters Patent No. 780,297, dated January 17, 1905.

Application filed November 16, 1903. Serial No. 181,405.

*To all whom it may concern:*

Be it known that we, STEPHEN R. KROM, of Plainfield, in the county of Union, and STANLEY V. KROM, of Jersey City, in the county of Hudson, State of New Jersey, both citizens of the United States, have invented an Improvement in the Process of Separating Graphite from Wollastonite, of which the following is a specification.

The material wollastonite treated by our process for the separation of the flake or crystalline graphite carried thereby is a mineral composed of about fifty-one and seven-tenths per cent. of silica and forty-eight and three-tenths per cent. of lime chemically united. Graphite held thereby is usually in flake form; and the object of our invention is to break up and destroy the chemical union of the lime and silica, and so free the graphite, which is later on used largely, but not exclusively, in the manufacture of crucibles.

In the first step of separating the graphite from the wollastonite the ore is crushed and reduced to a fine granular condition and is then mechanically separated, preferably by a pneumatic jig or dry concentrator. This separation has the result of dividing the readily-separable particles—that is to say, to the extent of about ninety per cent. The process of our invention has especially to do with the other ten per cent.—that is, the concentrates—which still contain more or less wollastonite.

The reason we are not able to free the graphite entirely from the wollastonite by mechanical means is due to the fact that this mineral wollastonite is fibrous in its structure and breaks up in needle-like grains, and some inclosed and adhering particles of wollastonite go over with the graphite. The coarse or heavier grains are readily separated by the mechanical means above referred to; but the very thin or fine needle-like grains tend more or less to go over with the graphite. It is to eliminate these fine needle-like adhering and inclosed particles of wollastonite from the graphite to which our invention and process relates.

In the particular part of the process forming our invention the concentrated material is treated to a bath of dilute acid, preferably sulfuric acid, because this acid is not only economical of use, but acts entirely satisfactorily. In this bath of dilute sulfuric acid the wollastonite absorbs the liquid, which causes the wollastonite to swell up, and the chemical bond or union between the silica and lime is by this action destroyed, the acid attacking the lime and the silica as an insoluble material being set free and the lime as a soluble material being turned by the dilute acid into a sulfate of lime. The union of the silica and lime having been destroyed by the action of the dilute acid, the mineral wollastonite readily crumbles to a fine powder under the manipulation of the hand or mechanical devices, and it is preferable in this action to wash the material thereafter with a liberal supply of water in a fine-mesh screen, so as to separate the graphite from the silica, the graphite remaining on the screen and the silica passing through the screen. In this operation the sulfate of lime under the action of the water is washed away, leaving the insoluble silica free to be removed. The dilute sulfuric acid is preferably about ten per cent. solution. The chemical action of the process is properly expressed in the following formula:

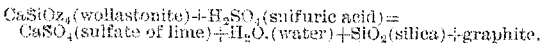

CaSiO$_4$(wollastonite)+H$_2$SO$_4$(sulfuric acid)=
 CaSO$_4$(sulfate of lime)+H$_2$O(water)+SiO$_2$(silica)+graphite.

In carrying out our process suitable mechanical devices are of course employed—such as tubs for the acid-bath and means for washing the graphite to clean it from the acid and the lime-water, besides screens properly mounted for screening out the powdered silica.

In the process the wollastonite after being treated with the acid for destroying the chemical bond or union between the silica and lime may be washed and screened for the removal of the silica or preferably washed, dried, and then screened for the removal of the silica and graphite.

While we have herein described our process as especially applicable for the treatment of the mineral wollastonite containing lime and silica with the graphite, we have found that our process is equally valuable for the treatment of a limestone carrying the graphite and without silica, except the part of the process that requires the use of a screen to free the graphite from the silica, as therein the washing removes all the sulfate of lime, leaving the graphite free.

While in carrying out the process we aim to entirely remove the silica from the graphite, so as to leave the graphite commercially pure, we may remark that a small percentage of silica with the graphite is not injurious, especially where the graphite is used in the manufacture of crucibles; but lime is an injurious element.

In the drawing we have illustrated our process diagrammatically, and therein $a$ represents a mass of wollastonite; $b$, the crusher for reducing the wollastonite to a fine granular condition; $c$, the mechanical separator for concentrating the ore; $d$, a bath of dilute sulfuric or other acid, in which the material is treated for the destruction of the chemical bond between the silica and lime and the conversion of the lime into sulfate of lime; $e$, a washer in which the product is washed to remove the lime.

$f$ represents a drier for the silica and graphite, and $g$ a separator for the mechanical separation of the silica and graphite, and $h$ a vessel to receive the substantially pure graphite.

We claim as our invention—

1. The process herein described for separating graphite from ores carrying the same, said process consisting in treating the material in a bath of dilute sulfuric acid and thereafter submitting the decomposed mixture to a concentrating washing for the recovery of the graphite.

2. The process herein specified for separating graphite from ores carrying the same, said process consisting in crushing the ore to a fine granular condition, separating the major portion of the graphite from the ore by dry concentration, treating the concentrates or residue in a bath of dilute sulfuric acid so as to break the chemical bond or union of the materials treated and thereafter submitting the decomposed mixture to a concentrating washing for the recovery of the graphite.

3. The process herein described of separating graphite from wollastonite, the same consisting in treating the wollastonite in a bath of a dilute acid so as to break up or destroy the chemical bond between the lime and silica of the wollastonite, submitting the decomposed mixture to a concentrating washing for the recovery of the graphite and to set the silica free, and thereafter mechanically separating the graphite from the silica.

4. The method herein specified of separating graphite from wallastonite, consisting in crushing the wollastonite to a fine granular condition, treating the same in a bath of dilute sulfuric acid, thereby causing the wollastonite to swell up and the acid to act for the destruction of the chemical bond between the silica and lime, and converting the lime into sulfate of lime, thereafter washing the product and washing the lime away, leaving the insoluble silica with the graphite as a residue, thereafter treating the graphite and the silica for the mechanical separation of the same so as to leave the graphite substantially free from silica.

5. The process herein specified of separating graphite from wollastonite, consisting in crushing the wollastonite ore to a fine granular condition, mechanically separating the major portion of the graphite from the ore by dry concentration, taking the ore concentrates and treating the same in a bath of dilute sulfuric acid, thereby causing the wollastonite to swell up and the acid to act for the destruction of the chemical bond between the silica and lime, converting the lime into sulfate of lime, thereafter washing the product and washing the lime away, leaving the insoluble silica with the graphite as a residue, and thereafter treating the graphite and the silica for the mechanical separation of the same so as to leave the graphite commercially pure.

6. The process herein specified of separating graphite from wollastonite, consisting in crushing the wollastonite ore to a fine granular condition, mechanically separating the major portion of the graphite from the ore by dry concentration, taking the ore concentrates and treating the same in a bath of dilute sulfuric acid, thereby causing the wollastonite to swell up and the acid to act for the destruction of the chemical bond between the silica and lime, converting the lime into sulfate of lime, thereafter washing the product and washing the lime away, leaving the insoluble silica with the graphite as a residue, drying the silica and graphite and thereafter treating the same for the mechanical separation of the silica and graphite so as to leave the graphite substantially pure.

Signed by us this 13th day of November, 1903.

STEPHEN R. KROM.
STANLEY V. KROM.

Witnesses:
GEO. T. PINCKNEY,
BERTHA M. ALLEN.